United States Patent [19]

Berglöff et al.

[11] Patent Number: 4,851,119

[45] Date of Patent: Jul. 25, 1989

[54] MACHINE FOR PRESSING AND DEWATERING OR FILTERING

[75] Inventors: Dag Berglöff; Heinz Perchthaler; Reinhard Pinter, all of Graz, Austria

[73] Assignee: Maschinenfabrik Andritz Actiengesellschaft, Graz, Austria

[21] Appl. No.: 84,587

[22] Filed: Aug. 12, 1987

[30] Foreign Application Priority Data

Aug. 18, 1986 [AT] Austria ........................... A 2213/86

[51] Int. Cl.[4] ............................................ B01D 33/04

[52] U.S. Cl. .................................. 210/400; 100/211; 210/401

[58] Field of Search .................. 210/400, 401; 100/57, 100/15, 152, 211, 212

[56] References Cited

U.S. PATENT DOCUMENTS 4,153,550 5/1979 Lautrette ........................ 210/401 X
4,187,776 2/1980 Schroder ........................ 100/211 X
4,427,157 1/1984 Klein ................................ 210/401 X
4,481,118 11/1984 Heissenberger et al. ........ 210/401 X

*Primary Examiner*—Charles Hart
*Attorney, Agent, or Firm*—Townsend and Townsend

[57] ABSTRACT

The invention relates to a machine for pressing or dewatering and filtering of suspensions, sludges and the like with at least one driven endless pressure belt and further in particular at least one circulating endless filter belt, the pressure belt serving for the support of the filter belt. For the exertion of surface pressure onto the pressure belt, at least one frame-like, resilient, elastic hollow pad or a resilient, elastic hollow frame is provided, their interior being suitable for the admission of pressure medium and the pad or frame enclosing a pressure space, with a gap being provided at least during the admission of pressure medium between the hollow pad or hollow frame and the pressure belt.

26 Claims, 2 Drawing Sheets

MACHINE FOR PRESSING AND DEWATERING OR FILTERING

The present invention relates to a machine for pressing and dewatering and filtering of sludges, pulps and other fibrous material suspensions with at least one driven endless pressure belt running over rollers, preferably with an upper and a lower pressure belt between which the material to be pressed, dewatered or filtered is made to pass, and at least one filter belt, preferably an upper and a lower screen belt between which the material to be pressed, dewatered or filtered is made to pass, the pressure belt being provided for supporting the filter belt, preferably one each pressure belt being provided for each filter belt, and with a supporting or pressing means stationary in operation an in particular plane, concavely or convexly curved on the side facing the pressure belt pressing the pressure belt(s) continuously moving in operation in relation to this means against the material to be pressed, dewatered or filtered, in particular against the filter belt(s).

It is the object of the invention to provide a machine for pressing, dewatering or filtering which exerts a continuous pressure over an extended period of time and whose pressing zone is so formed that the difference in thickness of the cake as well as the compression of the cake can be absorbed without loss of pressing force.

This object is achieved according to the invention in a machine of the type initially mentioned by providing at least one, conveniently separate, essentially closed, resilient, elastic hollow frame or frame-like, resilient, elastic hollow pad or hollow bladder or inflatable air chamber between the stationary supporting or pressing means and the pressure belt(s) continuously moving in relation to this means in operation on that surface facing this (these) pressure belt(s), the interior of the hollow frame or hollow pad being suitable for filling with a pressure medium and this hollow frame or hollow pad enclosing a pressure space and in addition, at least during admission of the pressure medium, a gap, in particular a lubricating gap, being provided immediately between the hollow frame or hollow pad and the pressure belt. In this, with particular advantage for the exertion of surface pressure on the pressure belt, the enclosed space as well as the interior of the hollow frame or frame-like hollow pad is provided with a cross section in the shape of a hollow pressure bladder and thus an essentially closed further pressure space being suitable for the admission of pressure medium, in particular pressure fluid or pressure water, the gap, conveniently a small gap in relation to the height of the pressure bladder, preferably from 0.005 to 0.1 mm, in particular about 0.03 mm, conveniently being independently adjustable by admitting pressure medium to the first mentioned pressure space and the pressure space in the hollow frame or pressure pad, and the pressure belt.

The gap formed between the pressure pad or hollow frame and the pressure belt is very small in relation to the thickness of the pressure belt and adjusts itself independently in operation as soon as pressure fluid is admitted to the pad and the pressure space. In the inactive state, i.e. in the inoperative state, the elastic pressure pad can optionally abut the pressure belt due to its elasticity.

In this embodiment, an in particular hydrostatic pressing action is achieved by the pressure space which is defined towards the outside by the elastic pressure pad(s). As a result, a gap of only a few hundredths of millimeters forms between this pressure pad, even at varying thickness of the press cake, so that only a small amount of the pressure medium escapes and has to be replaced, e.g. by a pump. Since there is no mechanical contact and only fluid friction between the moving pressure belt and the pressure pad or hollow frame in operation, friction forces and wear are extremely low. This results in a low requirement of driving power of the machine and assures a long service life and thus a very economic operation.

In a further development of the invention, it is convenient to form the hollow frame or the frame-like hollow elastic pressure pad of flexibly elastic material having tensile strength, in particular of fabric-reinforced plastic material, rubber or the like. The pressure space in the interior of the frame-like hollow elastic pressure pad or hollow frame can be closed against the pressure space adjacent the pressure belt or connected thereto. The latter is preferred, however. It may be convenient to subject the pressure space in the interior of the frame-like hollow pressure pad or hollow frame and the pressure space enclosed thereby and adjacent the pressure belt to varying pressures, in particular by connection to pressure media sources of different pressure media pressures.

In order to improve the discharge of pressed-out liquid, it is convenient to provide the pressure belt with grooves preferably extending at least partially transversely to the circulating direction of the pressure belt or filter belt on that side of the belt facing away from the hollow frame or frame-like hollow pad and facing the filter belt.

It is convenient to form the pressure belt of a material impermeable to liquid, preferably of liquid-impermeable plastic material or rubber.

It is further convenient to provide the frame-like, hollow, elastic pressure pad or the hollow frame self-adjusting along its marginal zones, which may be achieved by its resilient elasticity and by an appropriate control of the pressure medium or its supply or by appropriate connections between the pressure pad and the interior space enclosed by it.

The frame-like hollow elastic pressure pad or the hollow frame can in plan view of the filter belt or pressure belt be essentially quadrangular, preferably rectangular or square. It may be convenient to form the frame-like hollow elastic pressure pad or hollow frame viewed in cross section as a partial bladder, in particular approximately as a half-bladder. It is convenient to fasten the frame-like hollow elastic pressure pad or the hollow frame by means of at least one frame on a stationary support of the machine, with this frame preferably also of essentially quadrangular, preferably rectangular or square shape. The frame can be formed at least partially hollow.

In order to adjust the pressing operation to the dewatering properties, it is convenient to provide two or more spacially or abuttingly arranged frame-like hollow elastic pressure pads or hollow frames in circulating direction of the pressure belt or filter belt, with the interior pressure of said pads or frames being adjustable, preferably differently, in the pressure space. It may further be of advantage if two or more frame-like hollow elastic pressure pads or hollow frames are inserted into one another, with the respectively smaller pressure pad essentially completely enclosed by the respectively larger pressure pad.

For controlling the dewatering effect, it is often convenient to provide for pressures of different values to be exerted on the pressure space in the interior of the hollow pressure pad and the pressure space adjacent the pressure belt.

In practice, it is particularly convenient to provide, viewed in top and bottom plan view, two further sealing belts running in circulating direction with the inner marginal surface within the frame-like hollow pad or the hollow frame as well as with the outer marginal surface outside of the hollow pad or the hollow frame and within the supporting or pressing means between the screen belts or pressure belts, said sealing belts being essentially narrower than the screen belts and pressure belts and laterally sealingly defining the material to be filtered or pressed between the screen belts or pressure belts in operation so as to prevent the lateral escape of the material by pressure.

The filter press according to U.S. Pat. No. 4,153,550 is provided with an inflatable air chamber and filter belts. It is not provided, however, with pressure belts, hollow frames and a supporting means stationary in operation for such pressure belts or with the gap between the aforementioned hollow frame and pressure belts of this type. Instead of the stationary supporting means, there is one with discontinuous horizontal movement and this type of vertical movement during operation, i.e. during the pressing and filtering operation. The known supporting means is lowered onto the filter belt and thus onto the material to be pressed in cyclical sequence, then moved over a portion of the path with the filter belt, whereby the material is pressed, is then lifted off the filter belt and finally moved back into its starting position horizontally. An apparatus like this is certainly complicated and thus difficult to produce and unreliable in operation. Compared to this, the present invention permits continuous operation at flawless support of the pressure belts and filter belts particularly also in view of the gap between the hollow frames and the pressure belts, even at stationary supporting means.

The embodiment according to the invention is also superior to the configuration according to European patent application No. 01 63 820, as this does not permit effective dewatering because it is not provided with filter belts. Although it does have a frame-like hollow tube for sealing a pressure space, this tube is disposed in a deep groove in a pressure plate of the pressing means, in contrast to the present invention where it is arranged on the surface thereof, so that the deformation course of this known hollow space is strongly reduced. Moreover, the gap according to the invention is missing in this case, as well.

In the device for applying surface pressure on moving work pieces according to DE-OS No. 33 10 700, no filter belts are provided. Moreover, this publication relates to surface pressure for wooden material plates. Pressure chambers enclosed on part of their height by frame-like seals are provided. The seals sit on a membrane forming a hollow space together with the pressure plate. The lateral confines of the pressure chambers thus form the superposed seals and the membranes supporting them which themselves do not participate in the forming of a cavity until they are at a distance from the seal. In contrast to this, according to the invention, the hollow frames alone constitute the seal in question, which is not only simpler, but also offers more operational reliability in view of the gap, partly in lieu of the known seals.

The invention is explained in the following by means of exemplary embodiments of the object of the invention under reference to the accompanying drawings.

Figure 1:
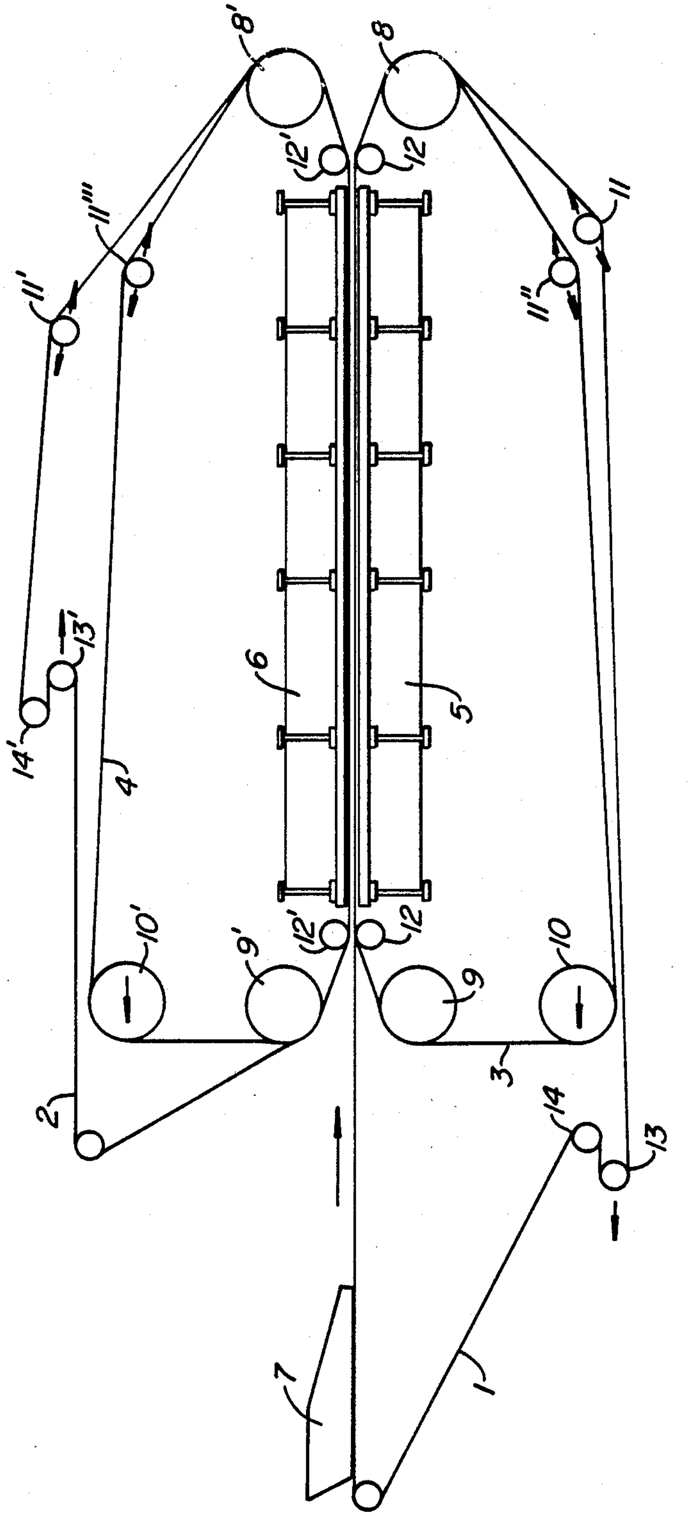
FIG. 1 shows a diagrammatic elevational view of a dewatering machine according to the invention.

The dewatering machine of compact construction diagrammatically represented in FIG. 1 comprises a lower endless filter belt 1 and an upper endless filter belt 2 between which the material to be dewatered is made to pass. The lower filter belt is formed as a supporting screen and passed over a number of rollers, namely, a screen regulating roller 11, a reversing roller 14 and a tensioning roller 13. The upper filter belt 2 is formed as a cover screen and passed over guide rollers 14', a tensioning roller 13' and a regulating rollers 11'.

The material to be dewatered is charged from a charging device 7 onto the lower filter belt 1 so that a cake of approximately equal thickness is formed to be dewatered between the two filter belts 1, 2.

In the pressing zone, the two filter belts 1, 2 are supported by circulating, endless pressure belts 3 and 4. The lower pressure belt 3 and the upper pressure belt 4 are passed over reversing rollers 9, 9', tensioning rollers 10, 10' and regulating rollers 11'', 11'''. The drive can be effected by rollers 8,8'. At the beginning and at the end of the pressing line, smaller reversing rollers 12, 12' are arranged. The pressure belts 3,4 are made of an elastic material impermeable to water and liquids, such as rubber or plastic material. In order to apply the required pressing power onto the pressure belts 3,4 and further onto the filter belts 1,2, and thus on the press cake lodged therebetween, supports 5,6 are provided. These supports 5,6 absorb the entire pressing power and are therefore of very sturdy construction. The upper and the lower supports 5,6 are connected to one another on both sides of the dewatering machine in order to achieve a transmission of the entire forces along a short path. This has the advantage that the very high pressing forces do not have to be transmitted to the machine frame, so that this machine frame can be of relatively lightweight and inexpensive construction. For the transfer of forces from the supports 5,6 to the moving pressure belts 3,4, a special hydrostatic means shown in detail in FIG. 2 is provided.

Figure 2:
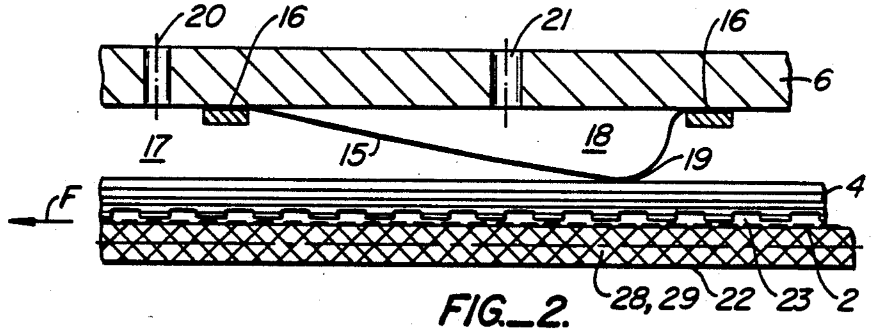
FIG. 2 shows a sectional view of the pressure pad of the machine according to the invention according to FIG. 1 in enlarged scale.

FIG. 2 shows a cross section through the hydrostatic pressure device in the form of a pressure pad, as an example of the arrangement on the upper support 6. For this purpose, a pressure bladder 15 consisting of flexibly elastic material having tensile strength, such as a web of fabric-reinforced plastic material or rubber, is clamped in a liquid-tight manner by means of square or rectangular frames 16 onto the upper support 6 so that an essentially closed pressure space 18 is formed. This pressure space 18 is filled or supplied, for instance via the orifice 21, with pressure medium, preferably compressed water. A second inlet 20 for the same or a different pressure medium provides hydraulic pressure in a pressure space 17 formed between the pressure belt 4 and the support 6. A portion of the pressure medium escapes from the pressure space 17 through the very narrow gap 19 between the pressure bladder 15 and the moving pressure belt 4. By the special shape of the pressure bladder 15 and its elasticity and the inlets 20 and 21, it is assured that the gap 19 adjusts itself to a very small value of only a few hundredths of millimeters to that only a small amount of pressure medium having to be continuously replaced by the inlet 20 escapes in spite of the superpressure in the pressure space 17. This makes it possible to maintain the superpressure in the pressure space 17 which also acts on the pressure belt 4 and thus transfers this pressure in the form of surface pressure to the upper filter belt 2 and thus to be press cake 22. The result is a surface pressing of the material to be pressed.

In case of fluctuations of the thickness of the press cake 22, such as they arise, for instance, by uneven charging, but also by compression of the press cake 22, the distance between the pressure belt 4 and the support 6 also changes. Due to the elastic execution of the pressure bladder 15 and its configuration and its pressure in the pressure space 18, it is assured that even at fluctuating cake thickness, an automatic adjustment of the pressure bladder 15 occurs, so that the gap 19 remains very small under all operating conditions. This constitutes a further main advantage of the invention, as only liquid friction is present in spite of high pressures applied on the surfaces between the stationary parts and the moving pressure belt 4, so that very low resistances occur and thus the driving output of the dewatering machine is also very low, which essentially improves the economy of the dewatering process.

The pressure belts 3,4 are preferably impermeable to liquids and provided on each of their sides facing the filter belts 1,2 with grooves 23 extending essentially transversely or obliquely to the circulating direction F of the pressure belts 3,4 or filter belts 1,2. On their sides facing the elastic pressure pad 15, the pressure belts 3,4 are formed smoothly.

Figure 3:
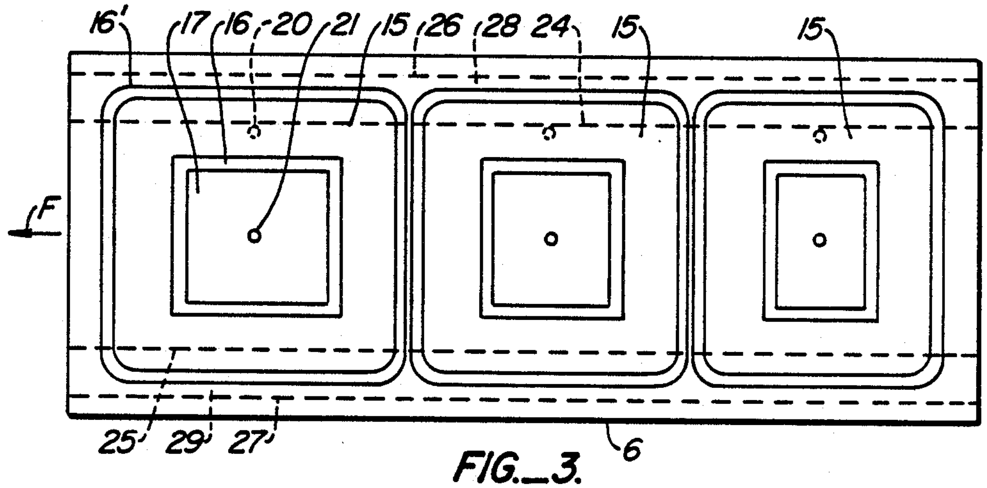
FIG. 3 shows the arrangement of several pressure pads arranged one behind the other in horizontal projection and FIG. 4 shows the arrangement of several pressure pads into one another.

FIG. 3 shows the arrangement of several pressure pads 15 in plan view. This diagrammatic view shows the rectangular or square shape of the pressure pads 15 with inner and outer clamping frames 16, 16′ and the inlet 20 of the pressure space 17 adjacent the pressure belt and the inlet 21 of the pressure space 18 within the pressure pad. A plurality of such pressure pads 15 can be arranged one behind the other on the supports 5,6 in running direction F of the pressure belts 3,4, FIG. 3 showing three pressure pads 15 arranged one behind the other as an example.

By the separate feeding of all three pressure spaces 17, it is possible to adjust the pressing pressures differently, for instance increasing in running direction of the machine. This is of great advantage for achieving the best dewatering effect and also results in a further improvement of the entire invention.

Figure 4:
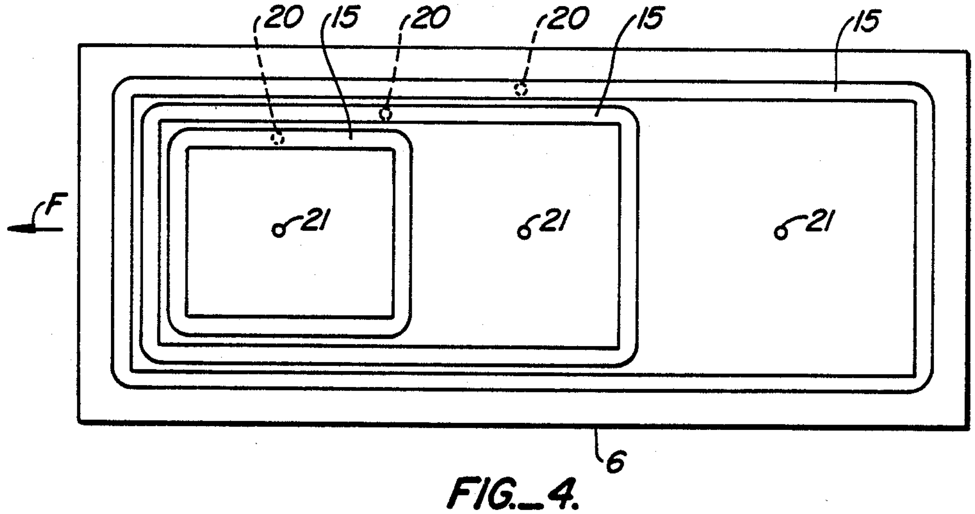

A further possibility of the arrangement of a plurality of pressure pads 15 is shown in FIG. 4. In this case, several pressure pads 15 are arranged not one behind the other, but instead one within the other, so that the larger pressure pad completely encloses the next smaller one. In this case, it is also possible to apply different pressures and thus adapt the pressing operation to the dewatering properties in order to obtain the optimal effect.

The represented dewatering machine for sludges, pulp or the like and fibrous materials operates according to the socalled double screen principle. The machine is provided with a lower screen formed as a supporting screen and an upper screen formed as a cover screen, the screens are made to pass over a number of reversing and regulating rollers. The material to be dewatered is charged onto the lower screen acting as a supporting screen by a charging means and then subjected to continuous pressing action over an extended period between the two screens. By this operation, a continuous dewatering is obtained and the content in dry matter is very high, so that, for instance, materials which have to be dried subsequently require very little energy in the drier.

The continuous pressing operation is carried out by means of the upper and the lower circulating pressure belts which are also made to pass over tensioning and reversing rollers. The pressure belts are impermeable in the exemplary embodiment shown and serve for exerting the required pressing power onto the two screen belts and thus on the press cake. For this purpose, a lower and an upper support for the two pressure belts by means of pressure pads is provided the pressure pads are capable of transferring a high pressure force at extremely low friction resistance onto the moving pressure belts. A plurality of elastic, hydrostatically acting pressure pads can be installed in the pressing zone of the dewatering machine and fastened to the stationary supports so as to exert an adjustable surface pressure onto the circulating pressure belts. These pressure belts are provided with grooves for evacuating the pressed-out liquid. The pressure belts press filter cloths or screens against the material lodged therebetween and thus achieve a dewatering to high dry material contents.

The machine can also be used for material to be pressed, in which case only pressure belts, but no filter or screen belts are provided. Pressing or supporting means with plane or concavely curved plates facing them can act on the pressure pads or hollow frames to be filled with pressure medium; the pressure pads or hollow frames could also be arranged in hollow chambers open towards the pressure belt. The material to be pressed could also be dry material.

According to the invention, an actual pressure space is provided only in the space enclosed by the hollow frame or pressure pad and within the interior of the frame or pad; after the zone surrounding the frame or pad, only leakage water or the like passes the lubricating gap 19.

For practical purposes, it is particularly convenient viewed in top or bottom plan view to provide two further sealing belts 28, 29 (FIG. 2, right hand; FIG. 3) running in circulating direction with the inner marginal surface 24, 25 (FIG. 3) within the frame-like hollow pad or hollow frame 15 as well as with the outer marginal surface 26, 27 (FIG. 3) outside of the hollow pad or hollow frame 15 and within the supporting or pressing means 6 between the screen belts 1,2 or pressure belts 3,4, the sealing belts being essentially narrower than the screen belts 1,2 or the pressure belts 3,4 and laterally sealing defining the material 22 to be dewatered, to be filtered or pressed present between the screen belts or pressure belts in operation so as to prevent the lateral escape of the material by pressure.

We claim:

1. A machine for pressing material with at least two machine parts oppositely arranged and adapted to press the material on both sides, at least one of said machine parts including at least one driven endless pressure belt running over rollers and at least one filter belt running over rollers, said pressure belt being adapted to support said filter belt, and with a stationary supporting means being adapted to press said pressure belt and said filter belt against the material to be pressed, said pressure belt and said filter belt being adapted to continuously move in operation in relation to the supporting means, comprising at least one essentially closed, resilient, elastic, hollow, inflatable chamber between said stationary supporting means and said pressure belt on that surface facing the pressure belt, the interior of the hollow chamber enclosing a pressure space and being filled with a pressure medium acting directly on the pressure belt, and, at least during admission of the pressure medium, a gap being provided immediately between the hollow chamber and the pressure belt to substantialy eliminate physical contact between the hollow chamber and the pressure belt.

2. The machine according to claim 1 with an upper and a lower pressure belt between which the material to be pressed is made to pass and an upper and a lower filter belt between which the material to be pressed is being made to pass, and one each pressure belt being provided for supporting each filter belt and with said supporting means pressing said pressure belts against said filter belts, characterized by providing at least an essentially closed, resilient, elastic hollow frame between the stationary supporting means and said pressure belts continuously moving in relation to this means in operation on that surface facing these pressure belts, the interior of the hollow frame or hollow pad being suitable for filling with a pressure medium and this frame or pad enclosing a pressure space and in addition, at least during admission of the pressure medium, a gap being provided immediately between the hollow frame and the pressure belt.

3. The machine according to claim 1, characterized by a separate hollow frame or pad.

4. The machine according to claim 1, characterized by a lubricating gap being provided between the hollow frame or pad and the pressure belt.

5. The machine according to claim 1, wherein for the exertion of surface pressure on the pressure belt, the enclosed pressure space as well as the interior of the hollow frame or the frame-like hollow pad are provided with a cross section in the shape of a hollow pressure bladder and thus an essentially closed further pressure space being suitable for the admission of pressure medium.

6. The machine according to claim 5, wherein said gap between the hollow frame or pressure pad and said pressure belt is independently adjustable by admitting pressure medium to the first-mentioned pressure space and the pressure space in the hollow frame or pressure pad.

7. The machine according to claim 1, wherein the hollow frame or the hollow elastic pressure pad is made of flexibly elastic material having tensile strength.

8. The machine according to claim 1, wherein the pressure space in the interior of the frame-like hollow elastic pressure pad or hollow frame is connected to the pressure space adjacent the pressure belt, said space being enclosed by the hollow pad or hollow frame.

9. The machine according to claim 1, wherein the pressure space in the interior of the frame-like hollow pressure pad or hollow frame and the pressure space adjacent the pressure belt, said space being enclosed by the hollow pad or frame, are subjectable to different presures.

10. The machine according to claim 1, wherein the pressure belt is provided with grooves extending transversely in relation to the circulating direction of the pressure belt or filter belt on that side of the belt facing away from the hollow frame or frame-like hollow pad and facing the filter belt.

11. The machine according to claim 1, wherein the pressure belt is formed impermeable to liquids.

12. The machine according to claim 1, wherein the frame-like hollow elastic pressure pad or the hollow frame in plan view onto the filter belt or pressure belt is formed essentially quadrangular.

13. The machine according to claim 12, wherein the hollow pad or frame in plan view onto the filter belt or pressure belt is formed rectangular or square.

14. The machine according to claim 1, wherein the frame-like hollow elastic pressure pad or the hollow frame viewed in cross section has the shape of a partial bladder, in particular approximately of a half-bladder.

15. The machine according to claim 1, wherein the frame-like, hollow elastic pressure pad or the hollow frame is fastened by means of at least one frame to a stationary support of the machine or the supporting or pressing means.

16. The machine according to claim 15, wherein said frame is closed and formed in particular essentially rectangular or square.

17. The machine according to claim 1, wherein at least two frame-like hollow elastic pressure pads or hollow frames whose interior pressures in the pressure space are adjustable are provided in circulating direction of the pressure belt or the filter belt.

18. The machine according to claim 17, wherein said interior pressures in the pressure space are differently adjustable.

19. The machine according to claim 1, wherein at least two frame-like hollow elastic pressure pads or hollow frames inserted into one another are provided, with the respective smaller pressure pad or hollow frame being essentially completely enclosed by the respective larger pressure pad or hollow frame.

20. The machine according to claim 1, wherein viewed in top or bottom plan view, two further sealing belts running in circulating direction with the inner marginal surface within the frame-like hollow pad or the hollow frame as well as with the outer marginal surface outside of the hollow pad or frame and within the supporting or pressing means between the filter belts or the pressure belts are provided, said sealing belts being essentially narrower than the filter or screen belts or the pressure belts and laterally sealingly defining the material to be filtered or pressed present between the filter belts or screen belts in operation so as to prevent the lateral escape of the material by pressure.

21. A belt press for pressing a material carried by the belt comprising:

a support;

a first belt, having first and second belt surfaces, movable over the support and carrying the material on the first belt surface; and a second, chosen fluid impervious belt, having third and fourth belt surfaces, movable with the first belt with the material between the first and third belt surfaces; and a press structure, mounted to the support, including:

a flexible pressurized bladder member, defining a first pressurized space at a first pressure, opposite the fourth belt surface; and a second pressurized space, defined between the fourth belt surface and the bladder, which applies the chosen fluid at a second pressure to the moving second belt so to press the material between the first and second belts.

22. The belt press of claim 21 wherein the bladder is configured and the first and second pressures are chosen to create a small lubricating gap between the bladder and the second belt to minimize frictional drag on the second belt while accommodating changes in the thickness of the material.

23. The press of claim 21 wherein the press structure is vertically above the first and second belts.

24. The press of claim 21 wherein the first belt includes an upper, mesh belt and a lower fluid impervious belt.

25. The press of claim 21 wherein the bladder has a rectangular shape so the fluid pressure applied to the moving second belt is rectangular in shape.

26. The press of claim 22 wherein the gap is about 0.005 mm to about 0.1 mm.

* * * * *